(12) United States Patent
Phipps

(10) Patent No.: US 7,566,096 B2
(45) Date of Patent: Jul. 28, 2009

(54) VEHICLE SEATING SYSTEM AND METHOD FOR REDUCING FATIGUE

(75) Inventor: Paul B. Phipps, Fishers, IN (US)

(73) Assignee: Innovative Biomechanical Solutions, Incorporated, Anderson, IN (US)

( * ) Notice: Subject to any disclaimer, the term of this patent is extended or adjusted under 35 U.S.C. 154(b) by 185 days.

(21) Appl. No.: 11/567,423

(22) Filed: Dec. 6, 2006

(65) Prior Publication Data

US 2007/0102969 A1  May 10, 2007

Related U.S. Application Data

(63) Continuation-in-part of application No. 11/241,264, filed on Sep. 30, 2005, now Pat. No. 7,422,285.

(51) Int. Cl.
*A47C 7/62* (2006.01)
*A47C 7/40* (2006.01)

(52) U.S. Cl. ............. 297/217.3; 297/284.1; 297/180.12

(58) Field of Classification Search ............... 297/217.2, 297/330, 217.1, 217.3, 180.12, 284.1, 284.4; 248/425, 429, 418
See application file for complete search history.

(56) References Cited

U.S. PATENT DOCUMENTS

| | | | |
|---|---|---|---|
| 4,722,550 A | 2/1988 | Imaoka et al. | |
| 4,840,425 A * | 6/1989 | Noble | 297/284.1 |
| 5,005,904 A | 4/1991 | Clemens et al. | |
| 5,127,708 A | 7/1992 | Kishi et al. | |
| 5,129,704 A | 7/1992 | Kishi et al. | |
| 5,155,685 A | 10/1992 | Kishi et al. | |
| 5,243,267 A | 9/1993 | Ogasawara | |
| 5,320,409 A | 6/1994 | Katoh et al. | |
| 5,321,617 A | 6/1994 | Mori et al. | |
| 5,411,468 A | 5/1995 | Chen | |
| 5,455,494 A | 10/1995 | Ogasawara | |
| 5,490,713 A | 2/1996 | Fukuoka | |
| 5,497,326 A | 3/1996 | Berland et al. | |
| 5,498,061 A | 3/1996 | Fukuoka | |
| 5,507,557 A | 4/1996 | Fukuoka | |
| 5,516,192 A | 5/1996 | Fukuoka | |
| 5,523,664 A | 6/1996 | Ogasawara | |
| 5,533,784 A | 7/1996 | Fukuoka | |
| 5,542,741 A | 8/1996 | Fukuoka | |
| 5,556,161 A | 9/1996 | Fukuoka | |
| 5,637,076 A | 6/1997 | Hazard et al. | |

(Continued)

OTHER PUBLICATIONS

International Search Report, International Application No. PCT/US08/51563, dated Jul. 1, 2008, 3 pages.

(Continued)

*Primary Examiner*—David Dunn
*Assistant Examiner*—Erika Garrett
(74) *Attorney, Agent, or Firm*—Woodard, Emhardt, Moriarty, McNett & Henry LLP

(57) ABSTRACT

A vehicle seating system can be used within a variety of vehicles to reduce positional fatigue and other effects of long distance traveling. Such a system includes a typical vehicle seat mountable in a vehicle, at least two powered seat energizer members, including at least one thermal energizer, and an electrical controller. The energizer members are activated to alter the seating condition created by the seat, thereby impacting circulation and reducing fatigue experienced by a vehicle traveler.

15 Claims, 15 Drawing Sheets

U.S. PATENT DOCUMENTS

| | | | |
|---|---|---|---|
| 5,647,633 A | | 7/1997 | Fukuoka |
| 5,812,399 A | | 9/1998 | Judic et al. |
| 5,816,653 A | | 10/1998 | Benson |
| 5,894,207 A | * | 4/1999 | Goings .................. 318/478 |
| 5,903,122 A | * | 5/1999 | Mesnage et al. ........... 318/469 |
| 5,930,152 A | | 7/1999 | Dumont et al. |
| 5,934,748 A | * | 8/1999 | Faust et al. ............ 297/180.12 |
| 6,007,151 A | | 12/1999 | Benson |
| 6,033,021 A | | 3/2000 | Udo et al. |
| 6,049,748 A | | 4/2000 | Newman et al. |
| 6,053,880 A | | 4/2000 | Sleichter, III |
| 6,055,473 A | | 4/2000 | Zwolinski et al. |
| 6,129,419 A | | 10/2000 | Neale |
| 6,497,454 B1 | | 12/2002 | Davidsson |
| 6,590,354 B2 | * | 7/2003 | Hein .................. 318/34 |
| 6,592,533 B1 | * | 7/2003 | Yonekawa et al. ........... 601/148 |
| 6,682,494 B1 | | 1/2004 | Sleichter, III et al. |
| 6,814,410 B2 | | 11/2004 | Piaulet et al. |
| 7,113,100 B2 | * | 9/2006 | Yoshinori et al. ........... 340/575 |
| 7,145,263 B2 | | 12/2006 | Nathan et al. |
| 7,152,920 B2 | | 12/2006 | Sugiyama et al. |
| 7,172,247 B2 | | 2/2007 | Beloch et al. |
| 7,239,096 B2 | * | 7/2007 | Hancock et al. .............. 318/59 |
| 7,422,285 B2 | | 9/2008 | Phipps |
| 2002/0070591 A1 | | 6/2002 | Nivet |
| 2002/0190549 A1 | | 12/2002 | Chien-Chuan |
| 2003/0075959 A1 | | 4/2003 | Xue et al. |
| 2004/0122574 A1 | | 6/2004 | Inman et al. |
| 2005/0127728 A1 | | 6/2005 | Sugiyama et al. |
| 2007/0241595 A1 | | 10/2007 | Nathan et al. |

OTHER PUBLICATIONS

Written Opinion of the International Searching Authority, International Application No. PCT/US08/51563, dated Jul. 1, 2008, 5 pages.
International Search Report for PCT/US06/37475, dated Jul. 16, 2007, 3 pages.
Written Opinion for PCT/US06/37475, dated Jul. 16, 2007, 4 pages.
"2009 BMW X5 Sports Activity Vehicle" BMW, p. 58.
"2010 Ford Taurus: More Hot, Less Bull", http://jalopnik.com/5116508/2010-ford-taurus-more-hot-less-bull, last accessed Jan. 13, 2009.
"How Stuff Works 1990-1999 Cadillac" http://auto.howstuffworks.com/1990-1999-cadillac9.htm, last accessed Jan. 27, 2009.

* cited by examiner

VEHICLE SEATING SYSTEM AND METHOD FOR REDUCING FATIGUE

CROSS-REFERENCE TO RELATED APPLICATIONS

This application is a continuation-in-part of U.S. Ser. No. 11/241,264, filed Sep. 30, 2005 now U.S. Pat. No. 7,422,285, and priority and the benefit of Ser. No. 11/241,264 are claimed in the present application to the extent the subject matter of this application is found in the previously filed application. The content of that application is incorporated herein by reference.

FIELD OF THE INVENTION

The present invention relates to vehicle seat adjustment systems and methods, and in particular a system and method for transitioning between various seat conditions to reduce fatigue.

BACKGROUND OF THE INVENTION

Vehicle passengers and drivers often experience various effects of traveling in a vehicle, and in particular, due to long distance traveling. These effects can include muscle fatigue, muscle stiffness and other related problems resulting from a person's body being in a stationary position for relatively long periods of time causing stagnant circulation. Often, from a medical standpoint, these problems can be the result of a condition known as ischemia. Ischemia is a restriction in blood supply, or in other words, an inadequate flow of blood to a part of the body, caused by the constriction or blockage of blood vessels. Relatively long periods of stationary positioning can cause ischemia to occur in various parts of the body. In response, a person naturally tends to change positions, even if only by a slight movement, impacting the person's circulation and restoring adequate blood flow to the affected area.

The fatigue and stiffness experienced by different muscle groups, and the effects felt as a result of ischemia, while traveling can be problematic for a vehicle user. Many travelers often find themselves adjusting their body in the vehicle seat or adjusting various seat position adjustment actuators or therapeutic controls individually, attempting to achieve greater traveling comfort. Adjusting his or her seat position or therapeutic settings can be distracting for a driver of a vehicle. Moreover, remaining in a stationary position for long periods of time can have various negative effects on a vehicle traveler's health, including the chance of blood clot formation as well as various other ailments.

There is a need for an improved vehicle seat position and therapeutic settings adjustment system. Certain embodiments address these and other needs.

SUMMARY OF THE INVENTION

Certain embodiments include a vehicle seating system for reducing user fatigue, comprising a seat mountable in a vehicle, at least two powered seat adjustment actuators, and an electrical controller for activating movement of the actuators. Each actuator is movable between a first position and a second position to alter the seating position formed by the seat, thereby reducing positional fatigue. The actuators reposition the seat to different seating positions with a slow movement average of less than about 10 centimeters per second when the actuators travel between the first positions and the second positions. In certain embodiments, the electrical controller has a control period and the control period has at least one fatigue period of at least ten minutes. In such embodiments, the controller automatically activates the slow movement average of the actuators between the first and second positions at least once both before and after a fatigue period.

Certain embodiments include a vehicle seating system, comprising a seat mountable in a vehicle, at least two powered seat energizer members, and an electrical controller for automatically activating the energizer members. Each energizer member is transitionable between a respective first status and a respective second status for shifting the seat through at least two different collective seating conditions. In certain embodiments, at least one of the energizer members is a thermal energizer. Additionally, in certain embodiments the electrical controller has a control period in which the automatic activation occurs, the control period having at least one hold period in which the electrical controller ceases activation of the energizer members.

The invention is set forth by the claims, and it is not limited by the foregoing.

It is an object of certain embodiments to provide an improved vehicle seat system and method.

BRIEF DESCRIPTION OF PREFERRED EMBODIMENTS

Figure 1:
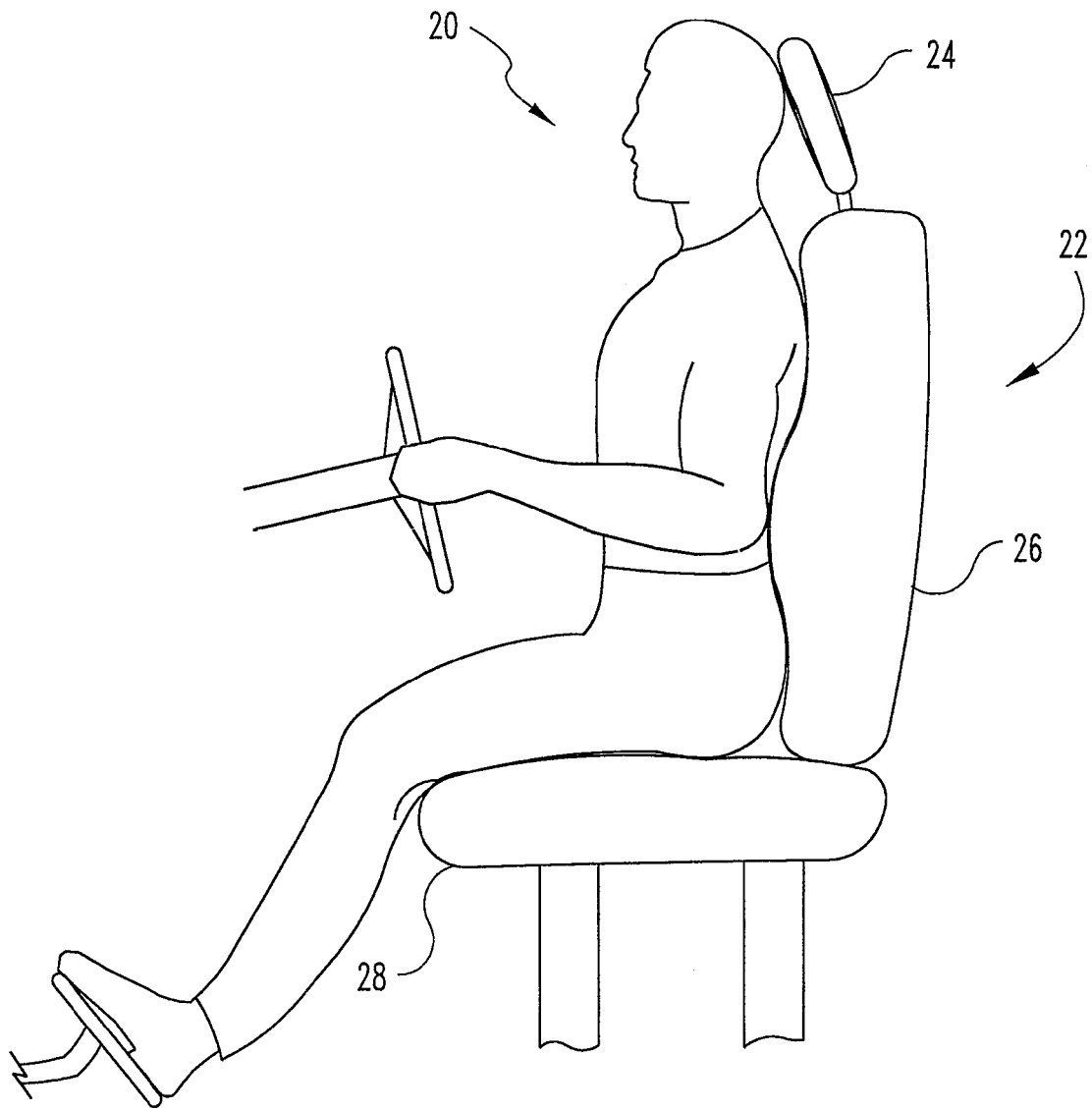
FIG. 1 is a perspective view of a vehicle seat and a user seated therein.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A vehicle seating system can be used within a variety of vehicles to reduce user fatigue and other effects of long distance traveling. Such a system includes a typical vehicle seat mountable in a vehicle, at least two powered seat adjustment actuators, and an electrical controller. Various embodiments of the system can be used within automobiles, trains, and/or airplanes, as examples. The actuators are moveable to alter the seating position formed by the seat, reducing positional fatigue of the user. The actuators preferably reposition the seat to different seating positions with a slow movement average of typically less than about 10 centimeters per second. The electrical controller has a control period which generally includes at least one movement period and, in certain embodiments, at least one stationary period. In a typical embodiment, the electrical controller initiates the control period after a first time period beginning when the vehicle is turned on. Thereafter, the control period preferably includes at least one movement period where the actuators automatically cycle through seating positions and reposition the user to reduce long distance traveling fatigue.

FIG. 1 illustrates a vehicle user 20 seated in a vehicular seat 22. A typical vehicular seat includes a head rest 24, a seat back 26, and a seat bottom 28. As illustrated in FIG. 1, the user is operating a motor vehicle by using a typical steering wheel and pedal system.

Figure 2:
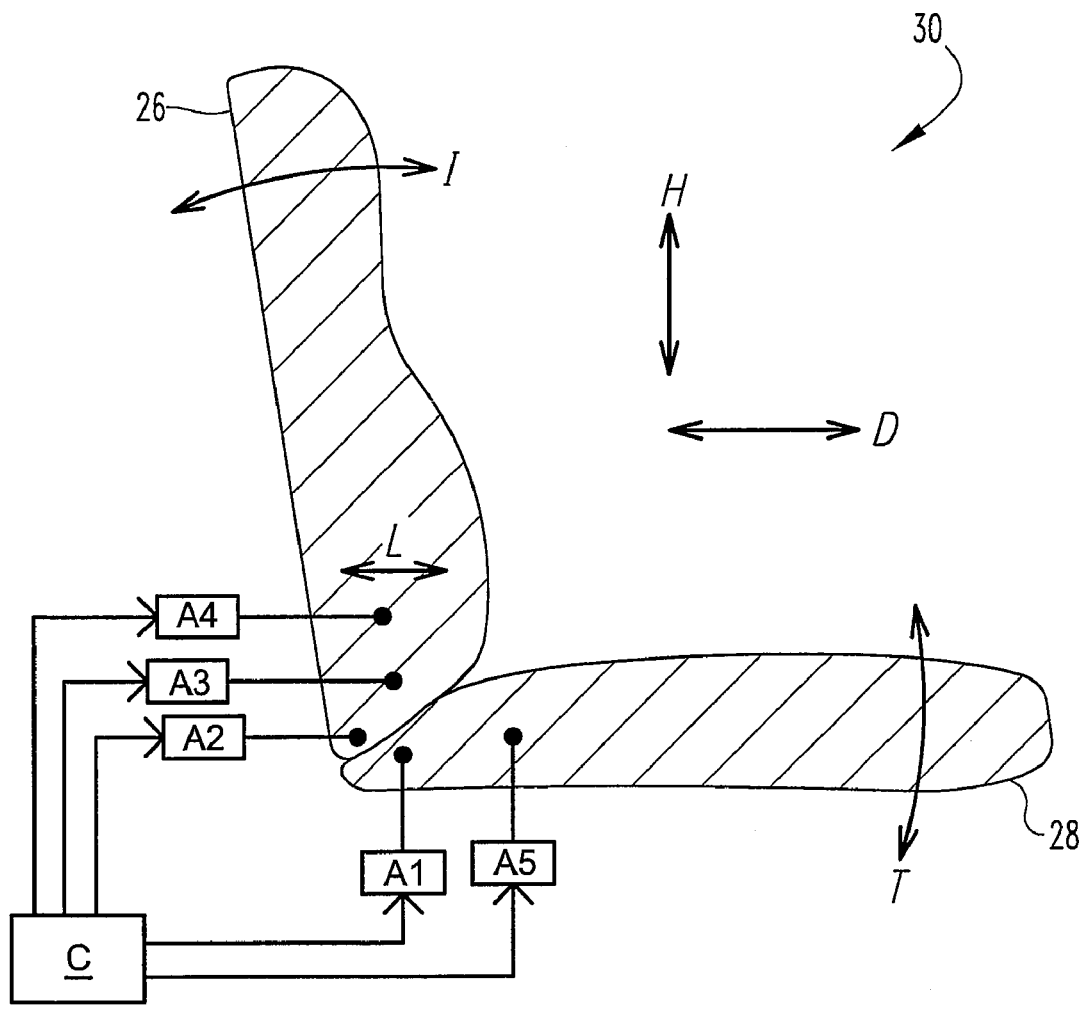
FIG. 2 is a side, partial cross-sectional view of a vehicle seating system embodiment.

FIG. 2 illustrates components of a vehicle seating system 30 designed to reduce user positional fatigue. It should be appreciated that the system can be associated with any type of vehicular seat. System 30 includes various powered seat adjustment actuators configured to move seat back 26 and seat bottom 28 in various manners, thereby altering the seating position formed by the seat. Certain typical embodiments include five actuators, such as a first actuator A1 to move both the seat back and the seat bottom in a generally vertical direction along a height axis H and a second actuator A2 to move both the seat back and the seat bottom in a generally horizontal direction along distance axis D. Movement along the distance axis D alters the distance that the seat is positioned relative to a steering wheel and pedal system for a driver's seat. A third actuator A3 is configured to move a lumbar region of the seat back along a lumbar axis L. A fourth actuator A4 and a fifth actuator A5 operate to incline or tilt the seat back along an I axis and the seat bottom along a T axis, respectively. The actuator power may be by motor, servo motor, stepper motor, pneumatics, hydraulics, or otherwise.

In preferred embodiments, movement of the actuators includes a slow movement average of less than about 10 centimeters per second. In certain embodiments, each actuator moves from a first position to a second position, and cycling of the actuators includes movement from the first positions to the second positions and returning to the first positions. In certain embodiments, the first position of each actuator is a base position and the second position of each actuator is the opposite, completely extended position of each actuator along the respective axis. However, in certain other embodiments, the first position of each actuator is a desired position, predetermined by the system or a user of the system.

System 30 generally includes an electrical controller C to automatically activate, operate, and cycle through the various actuators in a manner as to reduce positional fatigue. The electrical controller operates in conjunction with a microprocessor and/or computer chip technology to operate the system. The electrical controller preferably includes a control period. In certain preferred embodiments, the electrical controller initiates the control period when the vehicle is turned on. The control period can include a first stationary time period before movement begins. In certain other preferred embodiments, the electrical controller initiates the control period after passage of a first stationary time period, the first time period beginning when the vehicle is turned on. In certain preferred embodiments, the first stationary time period is about 20 minutes. In other preferred embodiments, the first stationary time period is about 30 minutes. However, it should be appreciated that the control period can begin at other appropriate times as would generally occur to one skilled in the art.

In certain embodiments, the control period includes at least one fatigue period of at least ten minutes. In a preferred embodiment, the fatigue period includes at least one segment of time in which at least one actuator is moving to reposition the vehicle seat. The control period preferably includes at least one movement period, the movement period including movement of at least one actuator. In certain preferred embodiments, the control period includes at least one movement period and at least one stationary period in which the actuators are motionless. In certain embodiments, the stationary period is at least 5 minutes in duration. In certain embodiments, the control period ends when the vehicle is turned off.

In certain preferred embodiments, the electrical controller is activated automatically when the vehicle is turned on. Additionally, the electrical controller can preferably be manually activated and de-activated by a user of the system. In such embodiments, a user of the system can manually switch the electrical controller on and off as desired. Additionally, in certain embodiments, the electrical controller is de-activated when the vehicle is turned off.

Figure 3:
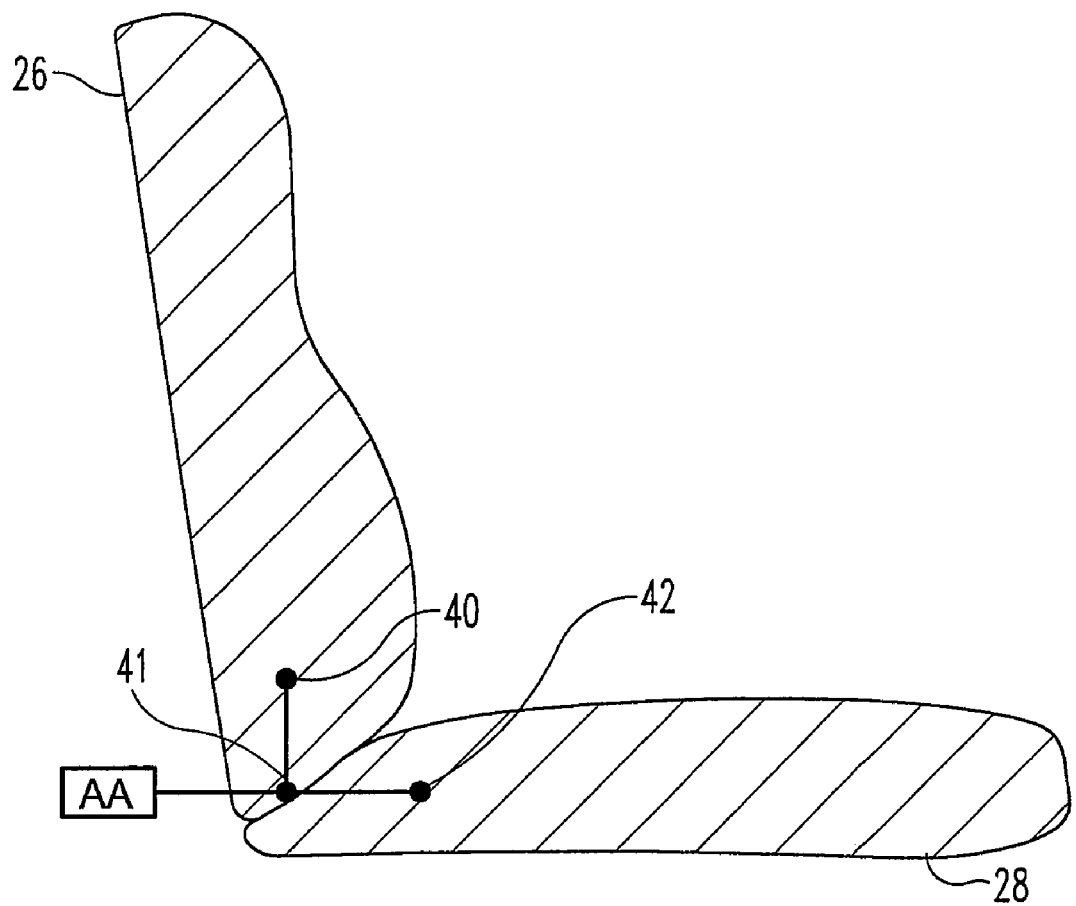
FIG. 3 is a side, partial cross-sectional view of another vehicle seating system embodiment.

FIG. 3 illustrates an alternative embodiment in which one actuating means AA, such as one power cylinder, is used to move the seat back and seat bottom to various seating positions through the use of various mechanical linkages such as bell cranks, worm gears, cams, etc. The actuating means AA and the mechanical linkages can be configured to cause movement at different actuating points, such as actuating points 40, 41, and 42, through the use of one actuating means. In other words, there may be one actuating means and more than one actuator at points 40, 41, and 42, for example. It is possible to link the actuators, as shown in FIG. 3; however, in certain preferred embodiments, the actuators operate independent of each other, as in FIG. 2.

FIGS. 4-12 are graphic illustrations of various embodiments of a vehicle seating system. The figures illustrate movement of various actuators along a horizontal Time axis and a vertical Movement axis. The Movement axes generally include a "1" denoting a first position and a "2" denoting a second position, and certain figures include delineations along the Movement axes denoting partial movement between the first and second positions. It should be appreciated that the first and second positions can be various combinations of actuators and activation position levels thereof, and can be randomly chosen or predetermined by the system or a user of the system. They could be full stroke or partial stroke (or rotation) of the actuators. In certain preferred embodiments, the transition time for the actuators to move from the first positions to the second positions is in the range of 20-40 seconds.

FIGS. 4-12 represent only a few of numerous embodiments of actuator movement profiles of a vehicle seating system as described herein. In the illustrated embodiments, optionally a first time period passes before movement on Movement Axis M between positions 1 and 2 of one or more actuators begins. In certain embodiments, the initial movement of one or more actuators is the beginning of the control period. In certain other embodiments, the control period includes an initial period of time of inaction of the actuators. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of actuators illustrated in the figures. It should be appreciated that the embodiments illustrated in the figures can include movement of a different number of actuators as would occur to one skilled in the art. Also, although the movement profiles illustrated in FIGS. 4-12 are linear segments, they may optionally include curvilinear segments as well. In preferred embodiments, the actuators move with a slow movement speed average of less than about 10 centimeters per second. Additionally, it should be appreciated that the activity of the actuators illustrated in the figures can continue indefinitely along the Time axis, with only a segment of the activity shown for clarity. Also, any and all of the profiles in FIGS. 4-12 and otherwise may be combined with each other.

Figure 4:
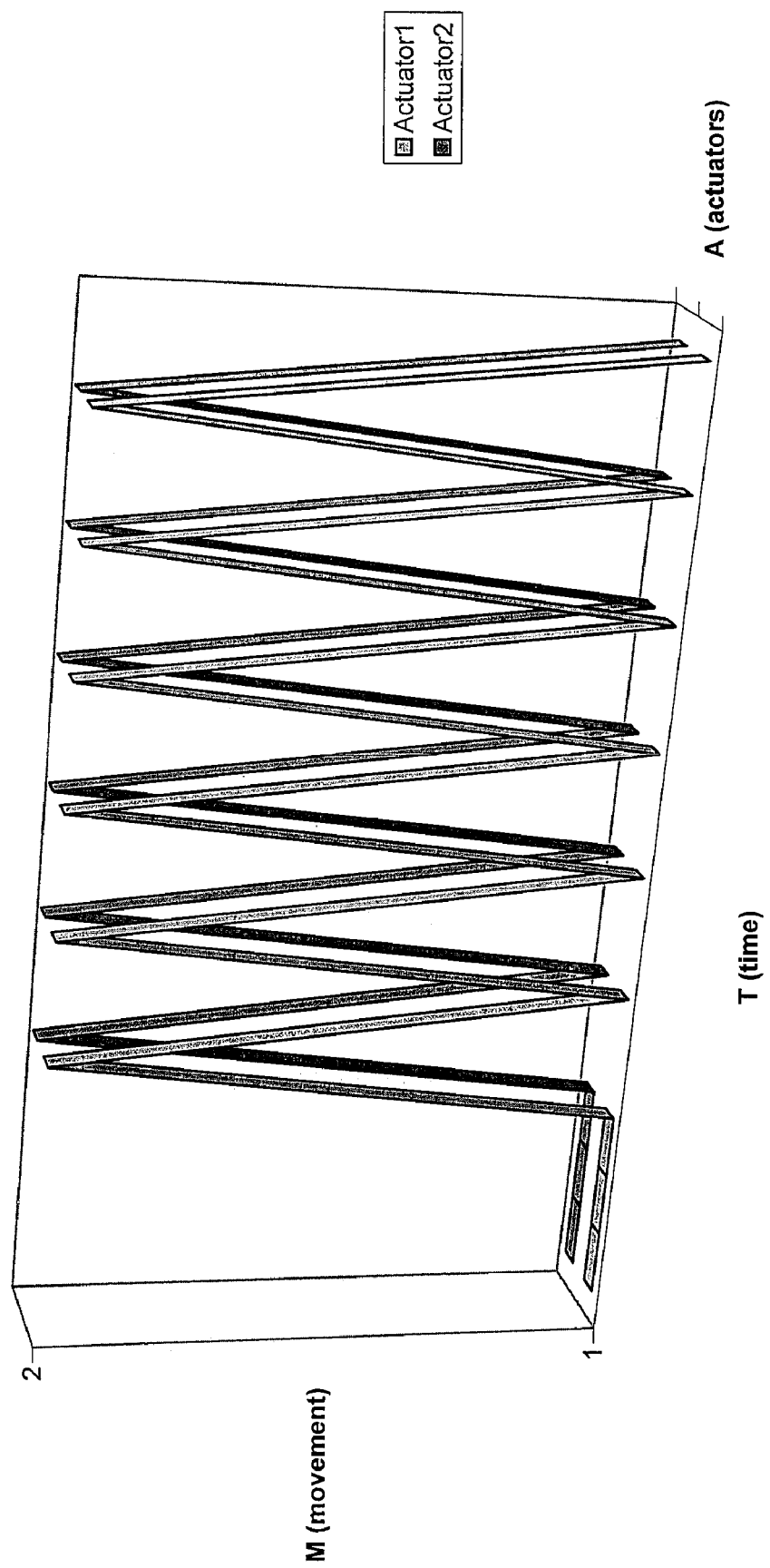
FIGS. 4-12 are graphic illustrations of various examples of movement profiles of a vehicle seating system herein.

The control period illustrated in FIG. 4 includes one continuous movement period, wherein at least one actuator is moving through different seating positions. FIG. 4 illustrates two such actuators; however, it should be appreciated that a different number of actuators can reposition the seat during the movement period. The movement period illustrated in FIG. 4 includes cycling of the various actuators from first positions to second positions continually until the control period ends. In certain preferred embodiments, the movement period illustrated in FIG. 4 includes movement of at least two seat adjustment actuators.

Figure 5:
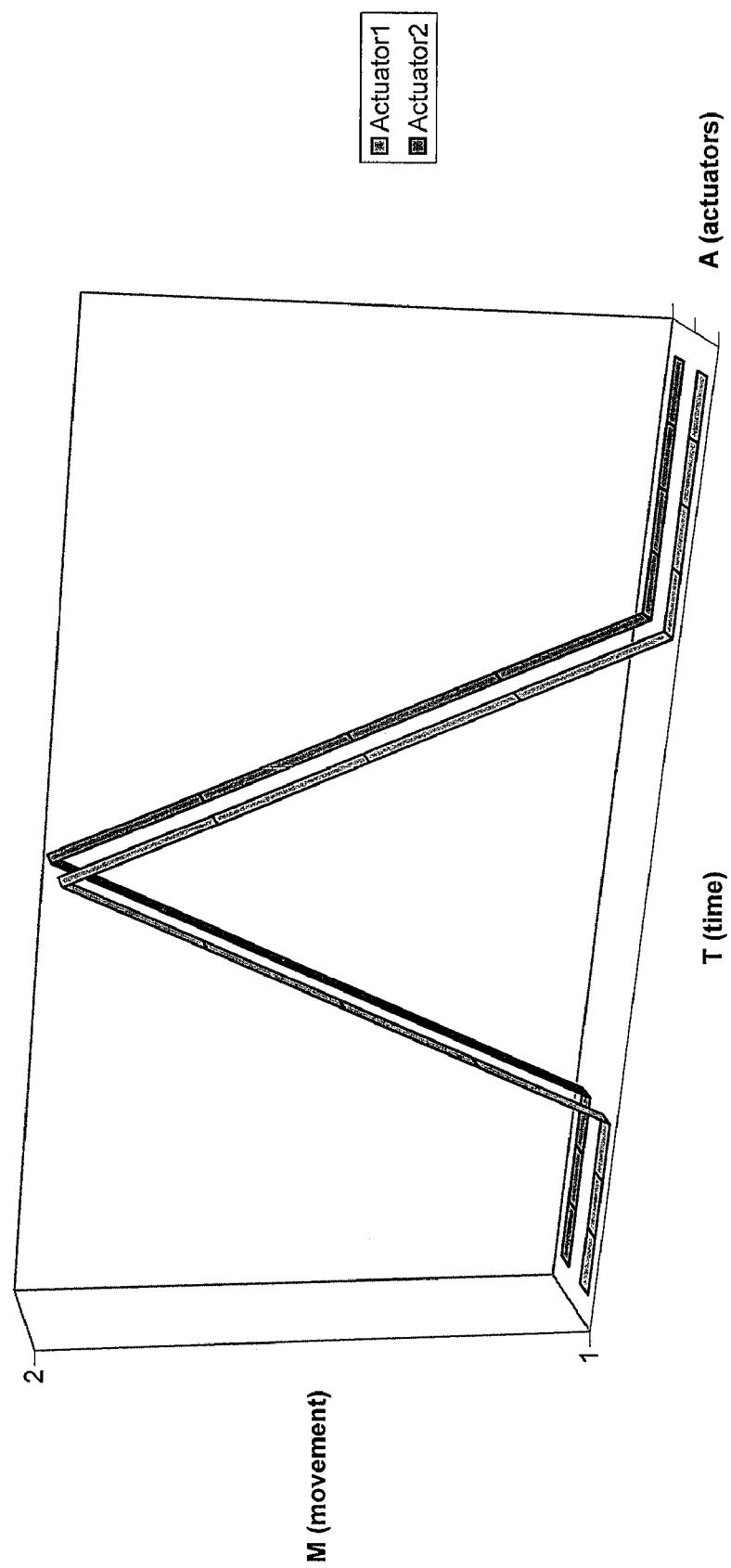

FIG. 5 is a graphic illustration of another possible embodiment of a vehicle seating system. In the embodiment illustrated in FIG. 5, the control period includes a movement period followed by a stationary period of inaction of the actuators. It should be appreciated that this movement period and stationary period alternating combination can continue along the Time axis. The illustrated movement period includes cycling of the actuators from respective first positions to second positions, and returning to the first positions. The embodiment illustrated in FIG. 5 includes relatively slow cycling of the actuators to reduce positional fatigue of a user without significant disruption to the user.

Figure 6:
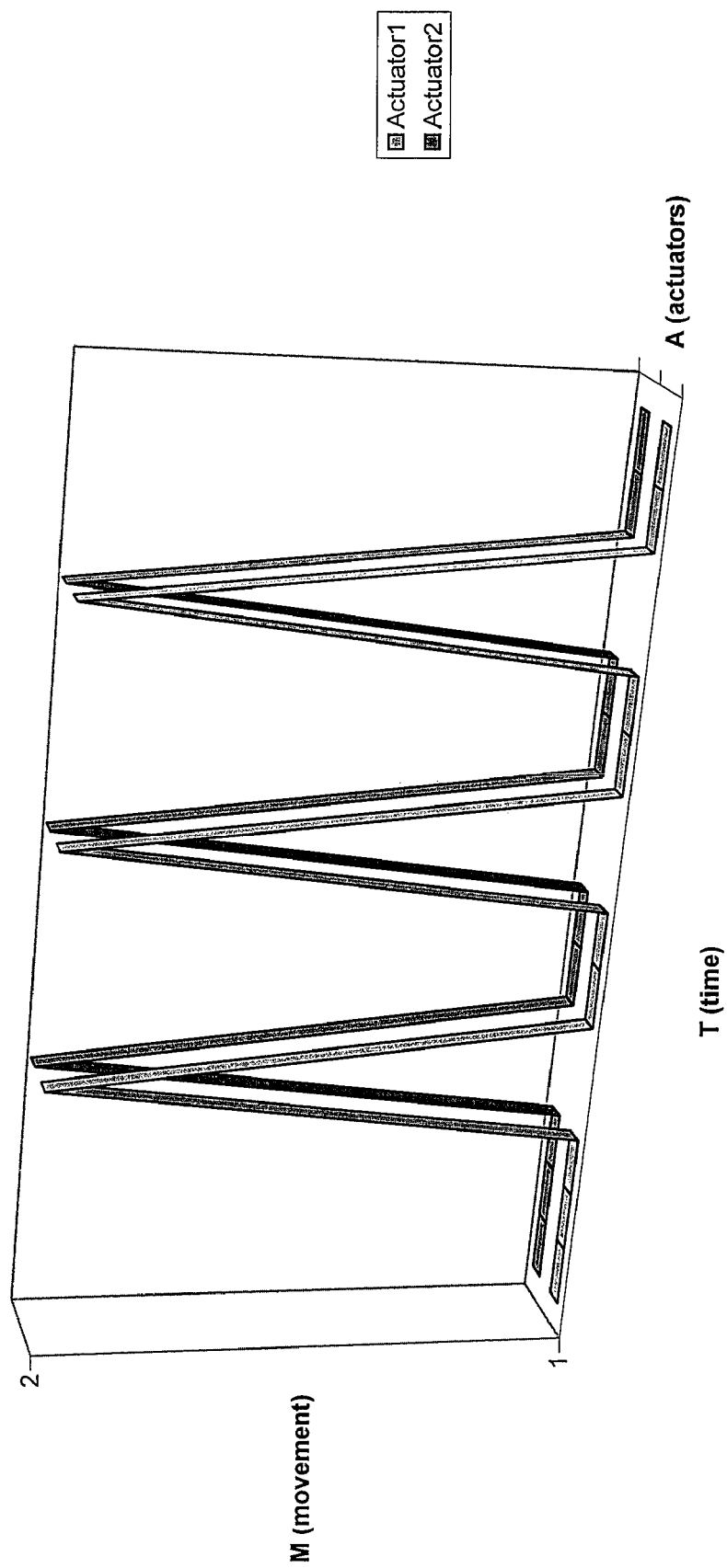

In the embodiment illustrated in FIG. 6, the control period includes alternating movement periods and stationary periods. In certain preferred embodiments, each movement period includes cycling of the actuators from first positions to second positions and returning to first positions. In such embodiments, each stationary period includes static positioning of the actuators at the first positions. However, it should be appreciated that, in certain alternative embodiments, a movement period can include movement of the actuators from first positions to second positions, and a next consecutive movement period can include movement of the actuators from second positions to first positions, with such a continuing alternating pattern. Additionally, in certain alternative embodiments, the movement periods can include other segments of the cycling from first positions to second positions, with stationary periods occurring therebetween.

Figure 7:
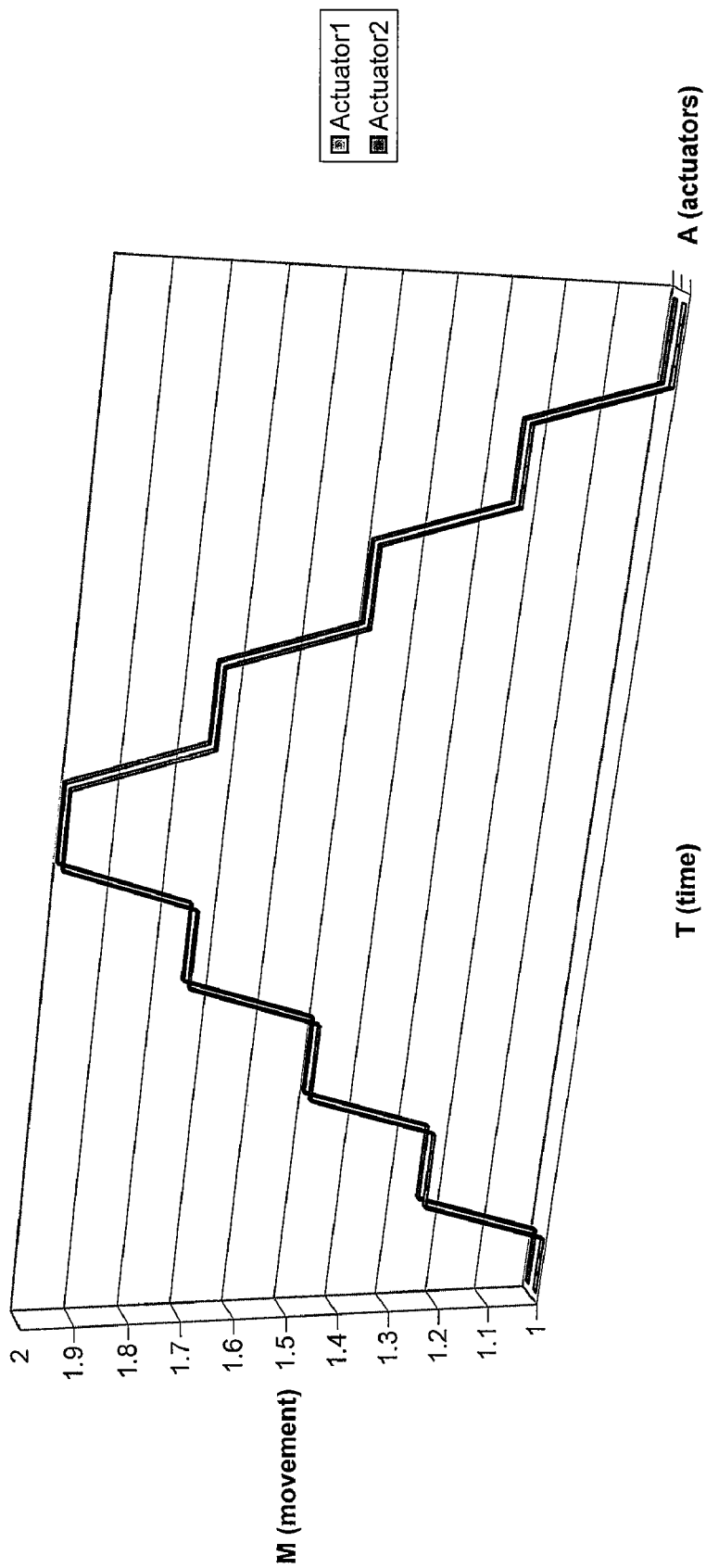

FIG. 7 is a graphic illustration of yet another possible embodiment of a vehicle seating system. In the embodiment illustrated in FIG. 7, the control period includes alternating movement periods and stationary periods. In certain preferred embodiments, each movement period includes slight movement of at least one actuator along a segment of the distance between the first and second positions. The movement periods begin with the at least one actuator moving from a first position toward a second position, and returning toward a first position, with stationary periods occurring throughout. In certain embodiments, the stationary periods are longer in duration than the movement periods, as illustrated. In the illustrated embodiment, the movement periods include movement equivalent to a quarter segment of the distance between the first and second positions. However, it should be appreciated that the movement periods can include different length segments as would occur to one skilled in the art, including different lengths than the illustrated embodiment and/or different lengths within the same control period for different movement periods.

Figure 8:
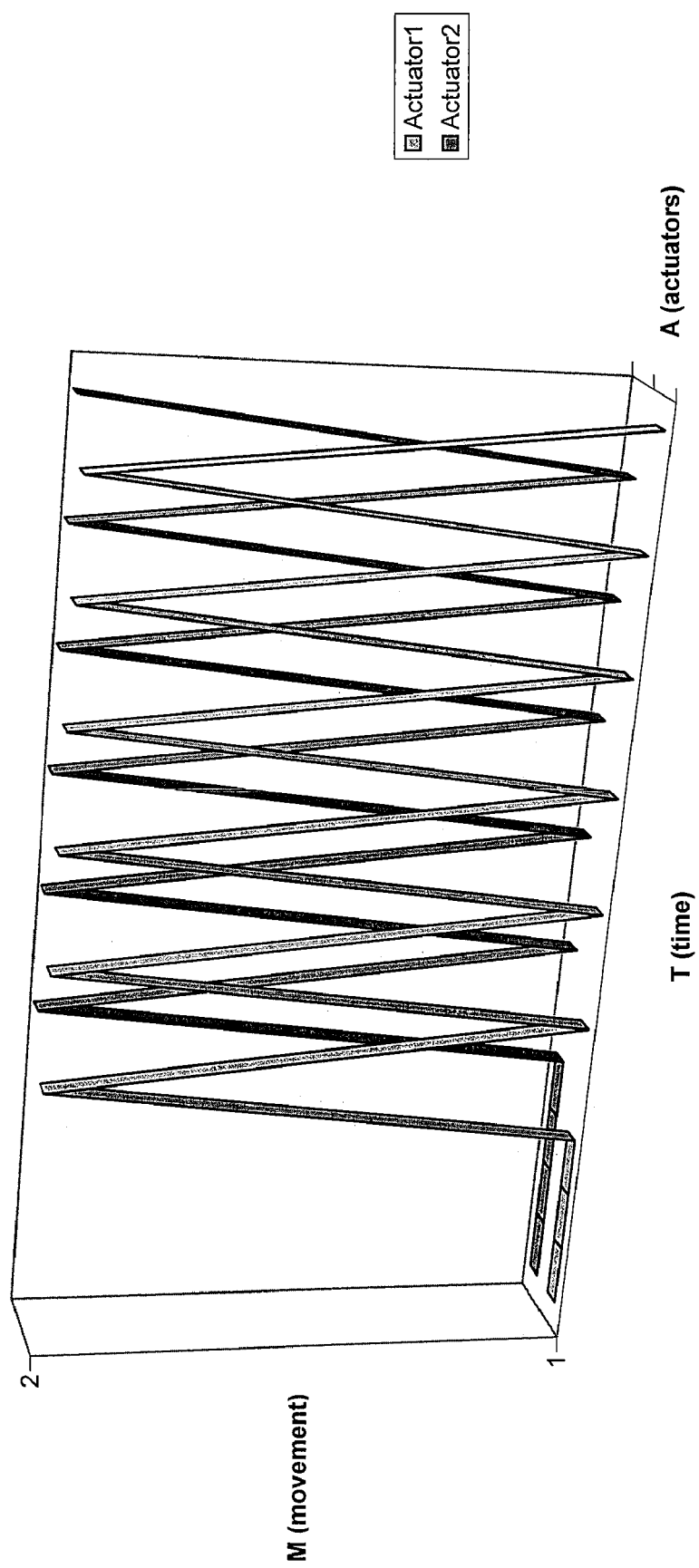

In the embodiment illustrated in FIG. 8, the control period includes one continuous movement period, wherein the actuators are moving through different seating positions, with one actuator moving before another. FIG. 8 illustrates two such actuators; however, it should be appreciated that a different number of actuators can reposition the seat during the movement period. The movement period illustrated in FIG. 8 includes cycling of the various actuators from first positions to second positions continually until the control period ends. In preferred embodiments, the actuators move such that certain actuators reach first positions when various other actuators reach second positions, and vice versa. In certain preferred embodiments, the movement period illustrated in FIG. 8 includes movement of at least two seat adjustment actuators.

Figure 9:
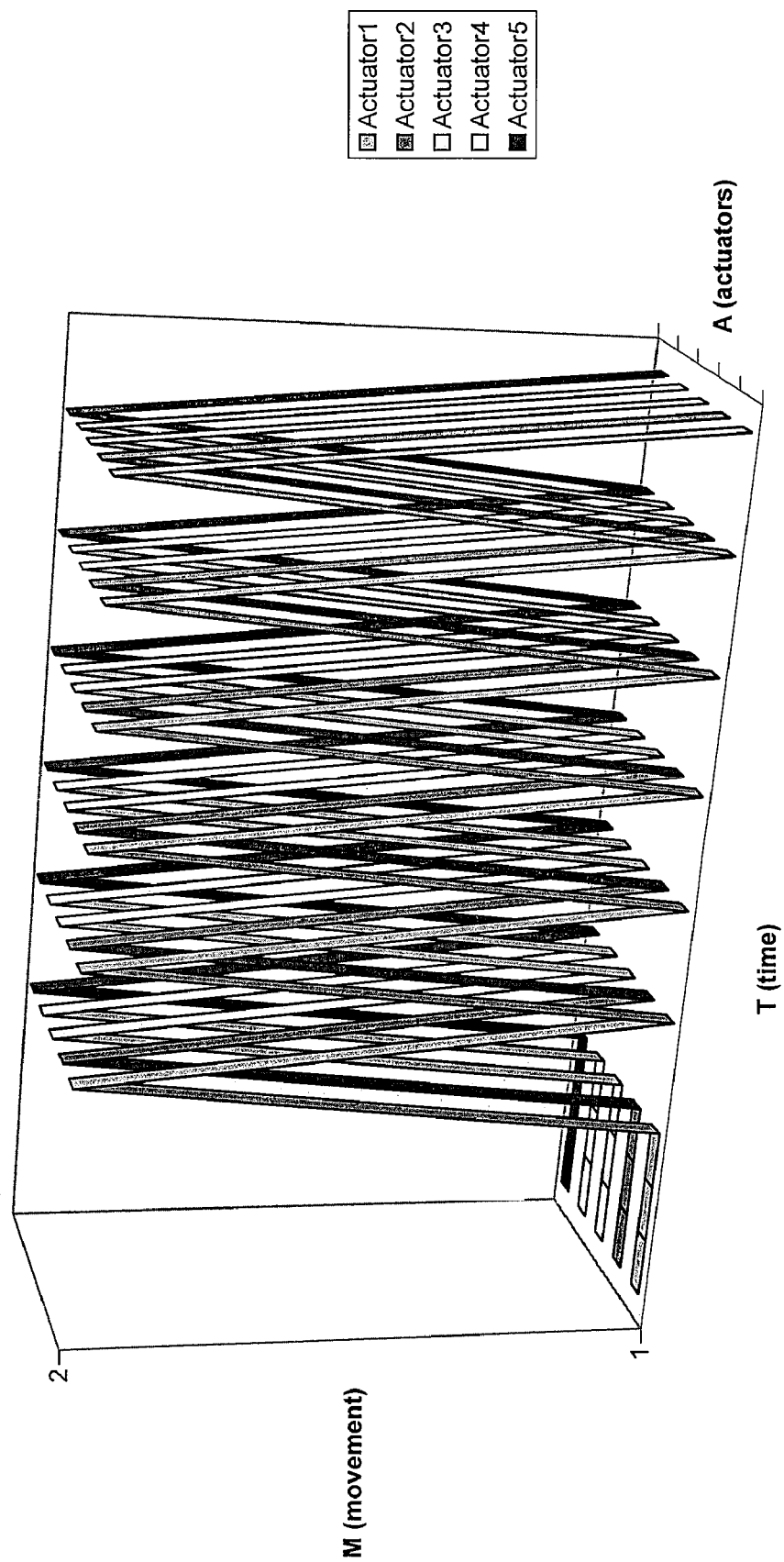

FIG. 9 is a graphic illustration of even another possible embodiment of a vehicle seating system. The control period illustrated in FIG. 9 includes one continuous movement period, wherein the actuators are moving simultaneously through different seating positions. In certain embodiments, the five actuators illustrated in FIG. 9 are the five actuators described in connection with FIG. 2. The movement period illustrated in FIG. 9 includes cycling of the various actuators from first positions to second positions, and back to first positions, continually until the control period ends and with a relatively slow movement average.

Figure 10:
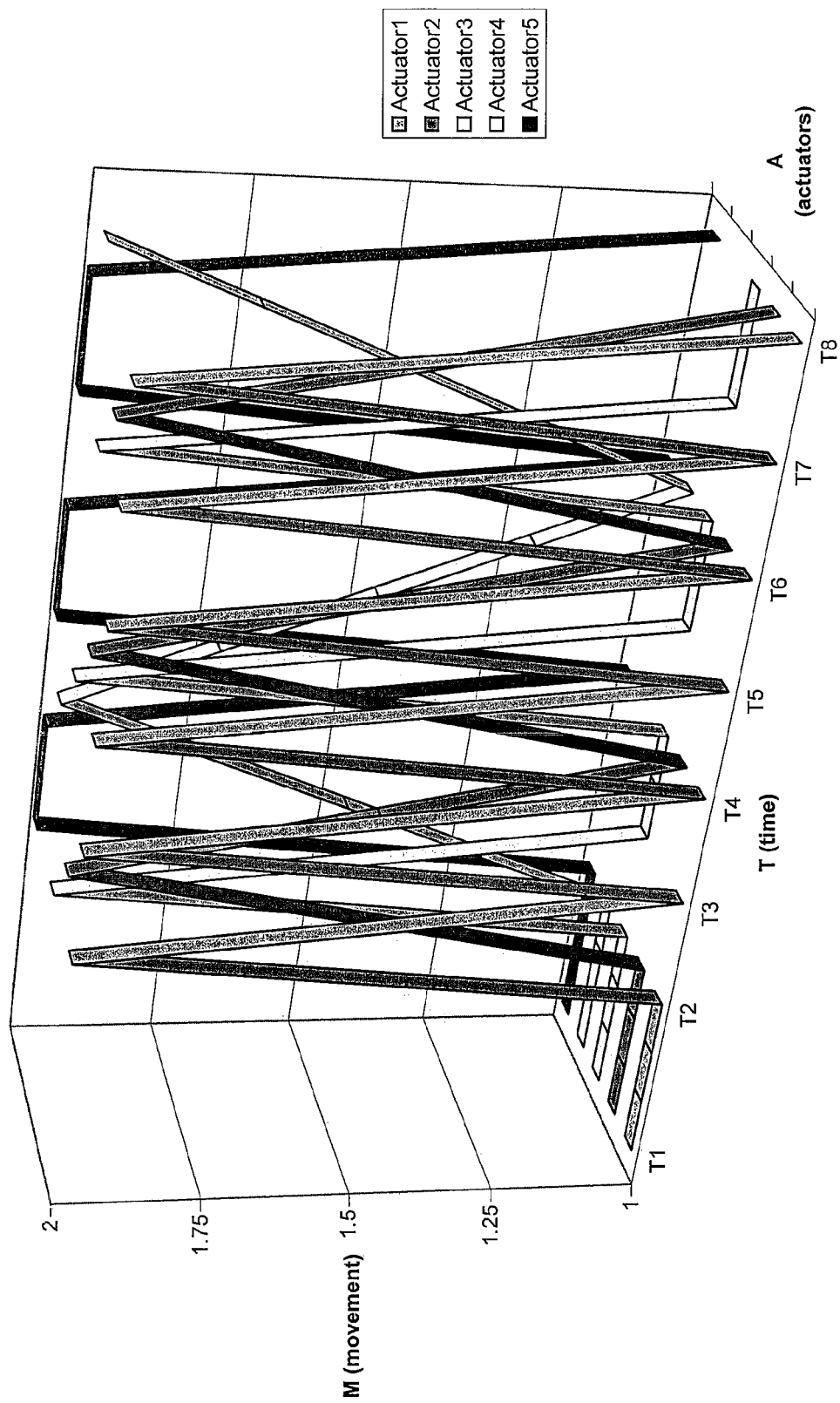

In the embodiment illustrated in FIG. 10, the control period includes various combinations of movement periods and stationary periods, wherein the actuators are moving through different seating positions. The movement period illustrated in FIG. 10 includes cycling of the various actuators from first positions to second positions, with some actuators having stationary periods at certain positions. FIG. 10 is illustrative of the possibility of the various actuators being activated to move at different speeds, and with different combinations of movement periods and stationary periods. Additionally, in certain embodiments, a user can preprogram various desired seating positions to be cycled through. Preferably, a user can set each actuator to a desired position, with the actuators collectively defining a preprogrammed seating position. In other embodiments, the seating positions are chosen at random by the system.

FIG. 10 illustrates times T1 through T8. In certain preferred embodiments, the vehicle is turned on at time T1, with electrical controller C being activated and initiating a control period at time T1. In the illustrated embodiment, a first stationary period occurs from time T1 to time T2, in which the actuators remain motionless at position 1, and movement periods begin at time T2. During the movement periods, the actuators cycle at various speeds and through various positions. In the illustrated embodiment, for example, actuator 1 cycles continuously through a single movement period from time T2 to T8, while actuator 5 includes alternating movement periods and stationary periods. Additionally, as a possible example, from time T2 to time T3, actuator 1 cycles from position 1 to position 2 and back to position 1, while actuator 5 cycles from position 1 to position 2 relatively quickly and then remains at position 2 through time T3. Actuator 5 then returns relatively quickly to position 1 at time T4, with this pattern continuing through the movement periods and stationary periods. However, it should be appreciated that other patterns can be implemented for the actuators as would occur to one skilled in the art and/or as desired by a user of the system. Additionally, it should be appreciated that the various movement patterns of the actuators can be randomly chosen by the vehicle seating system or can be pre-programmed by a user of the system. For brevity, the discussion of a control period including times T1 through T8, and the examples discussed herein, have been provided in conjunction with FIG. 10, but similarly apply to FIGS. 4-12.

Figure 11:
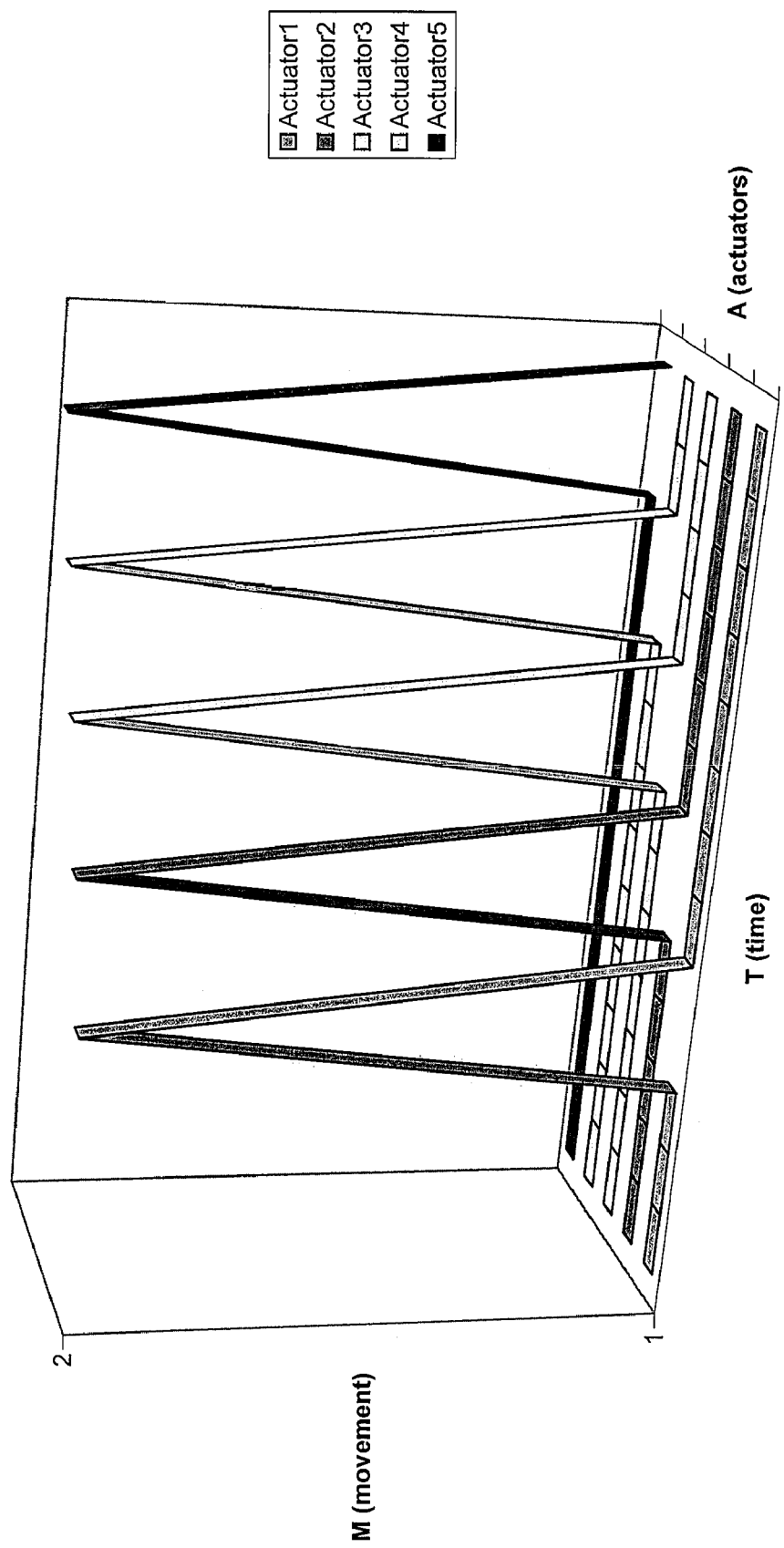

FIG. 11 is a graphic illustration of another possible embodiment of a vehicle seating system. The control period illustrated in FIG. 11 includes movement periods in which only one actuator is cycling through seating positions at a time. In certain embodiments, a first actuator cycles from a first position to a second position and back to a first position, with other actuators then following the same pattern. In such embodiments, each actuator includes periods of inactivity, with the overall control period including one continuous movement period with only one actuator cycling at a time.

Figure 12:
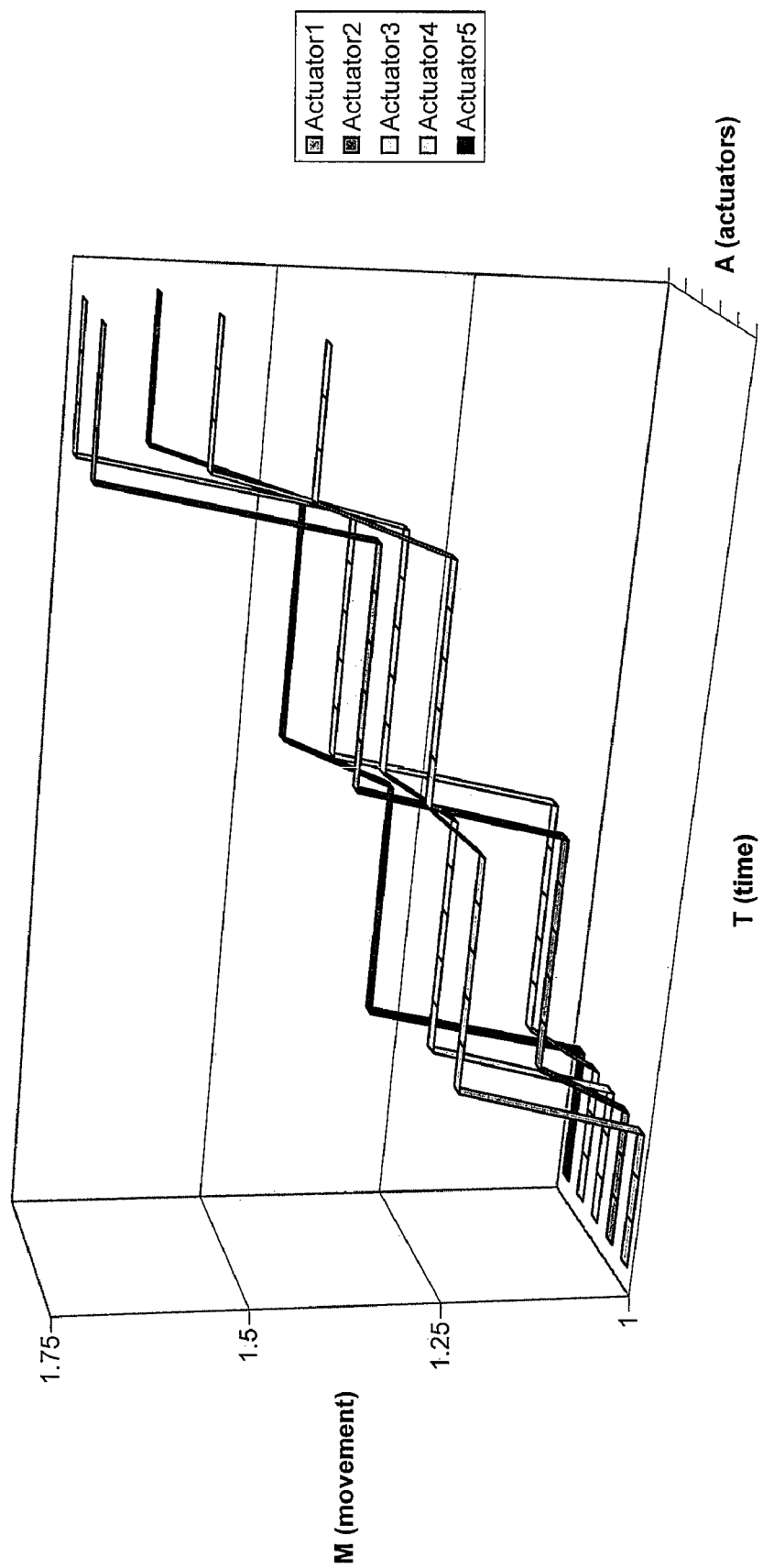

In the embodiment illustrated in FIG. 12, the control period includes alternating movement periods and stationary periods. The movement periods include movement of the actuators to specified predetermined positions, with stationary periods occurring therebetween. In certain preferred embodiments, a user of the system pre-selects one or more seating positions using a combination of positions of the actuators. In such embodiments, the movement periods cycle the actuators to the pre-selected seating positions with a slow movement average over the control period.

Additional embodiments of a vehicle seating system include a typical vehicle seat mountable in a vehicle, at least two powered seat energizer members, including at least one thermal energizer, and an electrical controller. The energizer members may also include mechanical energizers, such as a massaging energizer and/or seat position actuators as described above. The energizer members are optionally able to transition between various settings in conjunction with the seat to provide comfort to a user of the system and impact the user's circulation, thereby reducing positional fatigue experienced by the user. The electrical controller may have a control period which generally includes at least one activation period and, in certain embodiments, at least one hold period. In a typical embodiment, the electrical controller initiates the control period after a first time period beginning when the vehicle is turned on. Thereafter, the control period preferably includes at least one activation period where the energizer members automatically cycle through seating conditions to impact the user's circulation and reduce long distance traveling fatigue.

Figure 13:
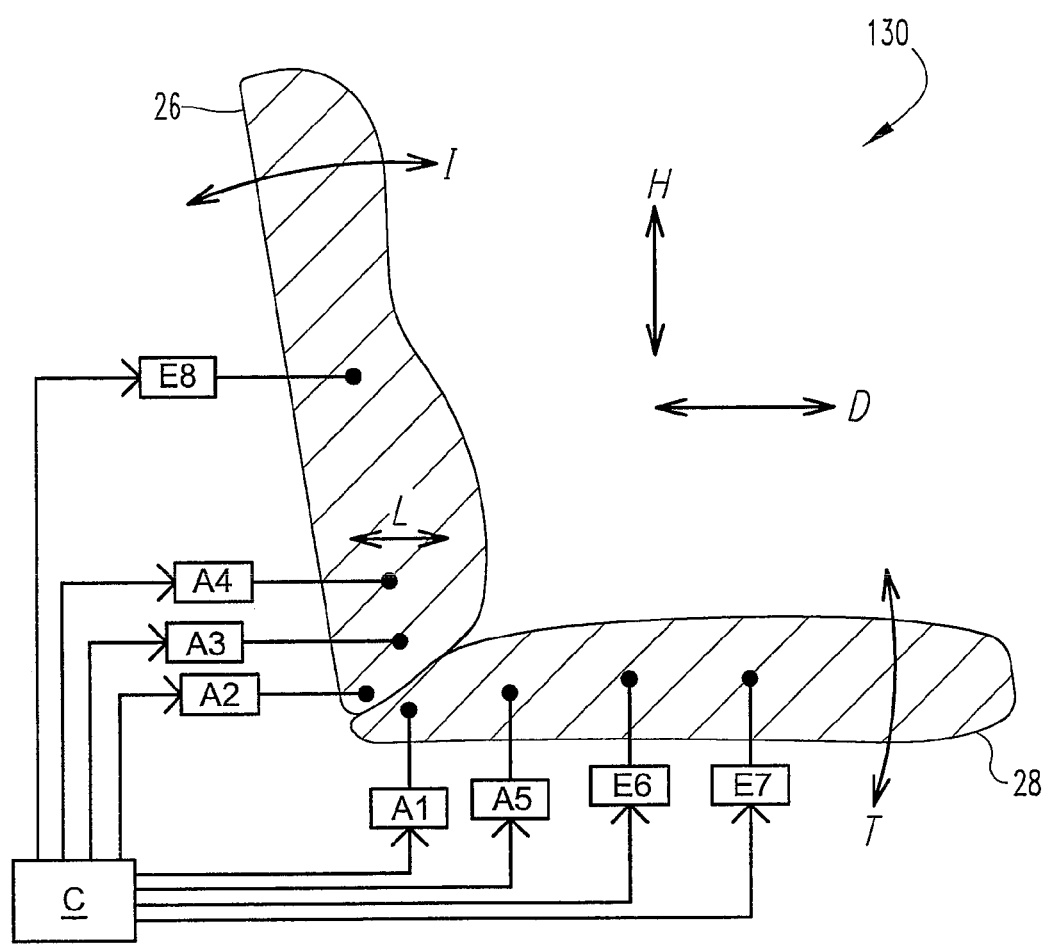
FIG. 13 is a side, partial cross-sectional view of another vehicle seating system embodiment.

Referring to FIG. 13, components of a seating system 130, similar in design and function to system 30, are illustrated. System 130 is designed to also help with one or more of the following: reduce user positional fatigue, reduce the effects of ischemia experienced by a user of the system during long distance traveling, and provide comfort to a user of the system. It should be appreciated that the system can be associated with any type of seat, including vehicular seat 22 as an example. System 130 can include various energizer members, including powered seat position-adjustment actuators configured to move seat back 26 and seat bottom 28 in various manners, thereby altering the seating position formed by the seat. In certain embodiments, system 130 can include one or more of the position-adjustment actuators described in conjunction with system 30, including actuators A1 through A5. As described above, actuator A1 can move the seat along height axis H, actuator A2 can move the seat along distance axis D, actuator A3 can provide lumbar movement along lumbar axis L, actuator A4 can tilt the seat back along axis I and actuator A5 can tilt the seat bottom along axis T.

Additionally, the energizer members of system 130 can include one or more thermal energizers configured to alter the seating temperature of the seat and impact the circulation of a user of the system. As examples, system 130 can include a heating energizer E6 configured to provide heat to the seat and a cooling energizer E7 configured to provide a cooling effect to the seat. Further, in addition to position-adjustment actuators, such as actuators A1 through A5, system 130 can include other mechanical energizers, such as a massaging energizer E8 configured to provide a provide a massaging effect to the seat. It is contemplated that other energizer members could be part of system 130 and/or system 30.

As described above, movement of the position-adjustment actuators A1 through A5 preferably includes a slow movement average of less than about 10 centimeters per second. Additionally, in certain embodiments, each actuator A1 through A5 and energizer E6 through E8 transitions from a first status to a second status, and cycling of the energizer members includes transitioning from the first statuses to the second statuses and returning to the first statuses. In certain embodiments, the first status of each position-adjustment actuator A1 through A5 is a base position and the second status of each position-adjustment actuator is the opposite, completely extended position of each actuator A1 through A5 along the respective axis. Additionally, in certain embodiments, the first status of each energizer E6 through E8 is the standard "off" setting, and the second status is the standard "on" setting. However, in certain other embodiments, the first status of each energizer member is a desired setting or position, predetermined by the system or a user of the system.

Similar to system 30, system 130 generally includes electrical controller C to automatically activate, operate, and/or cycle through the various energizer members in a manner as to reduce positional fatigue, impact a user's circulation, and reduce the effects of ischemia. The electrical controller C may operate as described above in connection with system 30, including having a control period with hold periods, and movement or activation periods. In certain embodiments, massaging energizer E8 may include the use and operation of electronically controlled massage therapy systems. As an example, energizer E8 can include inflatable and deflatable gas or fluid chambers operable to provide a massaging effect through the seat back of the vehicle seat. In certain embodiments, energizer E8 can provide a vibratory massaging effect. Additionally, in certain embodiments, energizer E8 can provide a rolling massaging effect traveling up and down the seat back of the vehicle seat, such as through the use of a rolling cam. Regarding the thermal energizers, heating and cooling energizers E6 and E7 may include the use and operation of conductive fluid to provide the desired thermal effect. Additionally, heating energizer E6 may include the user and operation of one or more electrical elements to provide heat to the vehicle seat.

Figure 14:
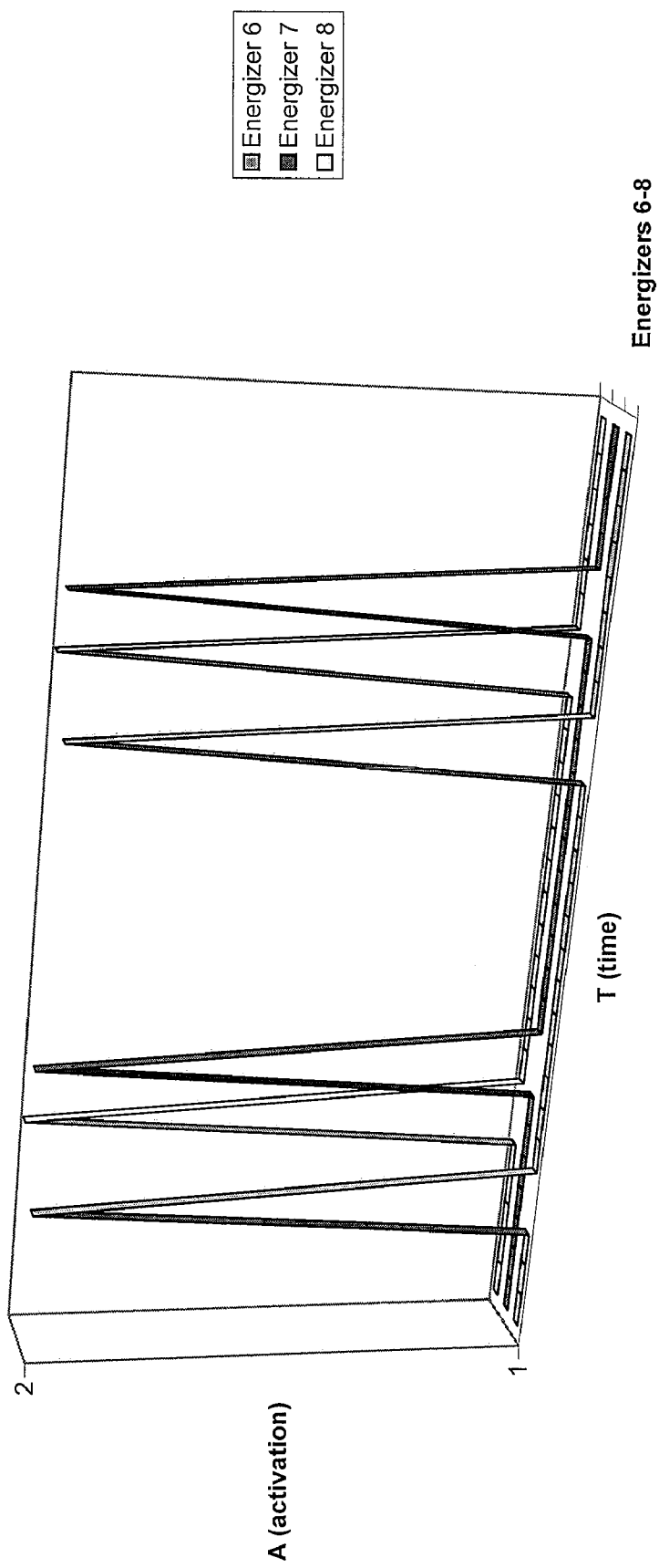
FIGS. 14-15 are graphic illustrations of further examples of condition profiles of another vehicle seating system herein.
Figure 15:
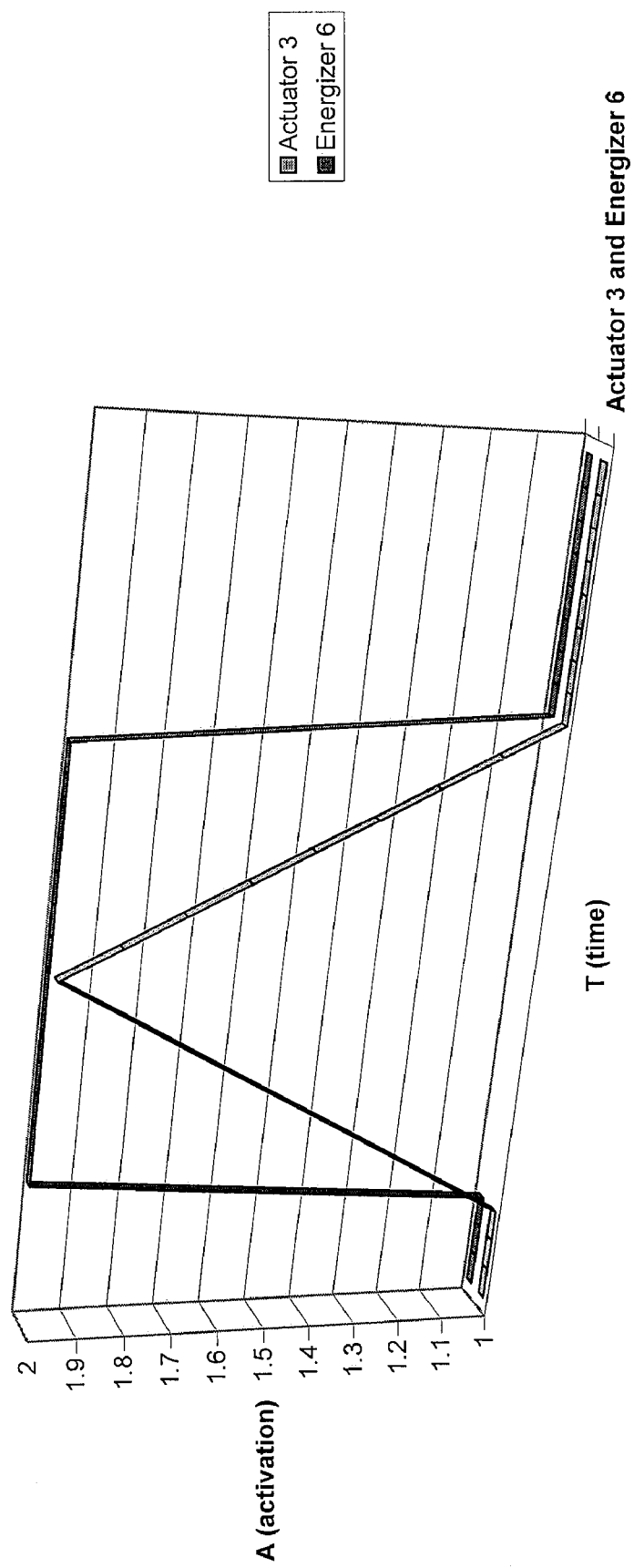

FIGS. 14-15 are graphic illustrations of various embodiments of a vehicle seating system. Similar to FIGS. 4-12, FIGS. 14-15 illustrate movement or activation of various energizer members along a horizontal Time axis and a vertical Activation axis. The Activation axes generally include a "1" denoting a first status and a "2" denoting a second status, and certain figures include delineations along the Activation axes denoting partial movement of the position-adjustment actuators between the first and second statuses. It should be appreciated that the first and second statuses can be various combinations of energizer members, and activation levels thereof, and can be randomly chosen or predetermined by the system or a user of the system. In certain embodiments, regarding energizers E6 through E8, the first situation "1" represents the particular energizer in the "off" position and the second situation "2" represents the particular energizer in the "on" position.

FIGS. 14-15 represent only two of the numerous possible embodiments of condition profiles of a vehicle seating system, such as system 130. In the illustrated embodiments, optionally a first time period passes before activation on Activation axis A of one or more energizer members begins. In certain embodiments, the initial activation of energizer members is the beginning of the control period. In certain other embodiments, the control period includes an initial period of time of inactivation of the energizer members. In other words, in certain embodiments the Time axis T begins with the vehicle turning on, and in certain other embodiments, the Time axis T begins with the beginning of the control period. Further, the illustrated embodiments are not meant to be limiting in any manner, including regarding the number of energizer members illustrated in the figures. It should be appreciated that the embodiments illustrated in the figures can include activation of a different number of energizer members. Also, although the condition profiles illustrated in FIGS. 14-15 are linear segments, they may optionally include curvilinear segments as well. It should be appreciated that the activity of the energizer members illustrated in the figures can continue indefinitely along the Time axis T, with only a segment of the activity shown for clarity. Also, any and all of the profiles in FIGS. 4-12 and 14-15 may be combined with each other.

FIG. 14 is a graphic illustration of a possible embodiment of a vehicle seating system, such as system 130 for example. The control period illustrated in FIG. 14 includes activation periods in which only one energizer member is initiated to transition through seating conditions at a time. In certain embodiments, a first energizer member transitions from a first status to a second status and back to a first status, with other energizer members then following the same pattern. In such embodiments, each energizer member includes periods of inactivity, with each activation period including only one energizer member transitioning at a time. In the embodiment illustrated in FIG. 14, heating energizer E6 initially transitions to the second status "2" for a certain amount of time, representing that the heating energizer is turned on, with the heating energizer E6 then transitioning back to the first status "1", representing that the heating energizer is turned off. According to the illustrated embodiment, following the activation of heating energizer E6, massaging energizer E8 follows a similar pattern and then cooling energizer E7 follows a similar pattern. A hold period follows activation of the cooling energizer E7, with the pattern continuing again after the hold period.

FIG. 15 illustrates another graphic illustration of a possible embodiment of a vehicle seating system, such as system 130 for example. In the embodiment illustrated in FIG. 15, the control period includes an activation period with one or more energizer members remaining at the second status while one or more other energizer members are slowly transitioning between the first and second statuses. In certain embodiments, the control period begins when the vehicle is turned on, and thereafter includes a hold period before activation of energizer members is initiated. Additionally, in certain embodiments, each activation period includes slow movement of at least one position-adjustment actuator, such as lumbar actuator A3, between the first and second statuses, while at least one thermal energizer, such as heating energizer E6, continually remains at the second "on" status. It is contemplated that the activation and hold periods can be longer or shorter in time, than as illustrated in FIG. 15, as would generally occur to one skilled in the art.

During the activation periods of the illustrated embodiment, the energizer members cycle at various speeds and through various statuses. For example, heating energizer E6 may transition to the second "on" status, remain at the second status for a certain time period and then transition back to the first "off" status. At the same time, in the illustrated embodiment, lumbar actuator A3 may be activated and slowly transition from a first status to a second status, and back to a first status. In other embodiments, lumbar actuator A3 could transition at least twice between the first and second statuses during one activation period. However, it should be appreciated that other patterns can be implemented for the energizer members. Additionally, it should be appreciated that the various patterns of the energizer members can be randomly chosen by the vehicle seating system or can be pre-programmed by a user of the system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle seating system, comprising:
   a seat mountable in a vehicle and having a seat back;
   at least two powered seat energizer members, each transitionable between a respective first status and a respective second status;
   wherein at least one of said energizer members is a temperature-adjustment energizer for altering the seating temperature, and
   wherein at least one of said energizer members is a position-adjustment seat back inclining actuator for altering the seating position formed by said seat to reduce positional fatigue by inclining said seat back; and
   an electrical controller preprogrammed with at least one preprogrammed profile extending at least 10 minutes and defining at least two different collective seating conditions along said profile in which at least one of said seat energizer members are static, wherein said electrical controller is operable to automatically activate, as a function of time, said seat back inclining actuator and said temperature-adjustment energizer according to said preprogrammed profile, said electrical controller having a control period including at least one activation period and at least one hold period, said energizer members each being activated at least after said hold period.

2. The system of claim 1, wherein said control period includes a first hold period at the beginning of said control period, wherein said electrical controller ceases activation of said energizer members during said hold period.

3. The system of claim 1, wherein said temperature-adjustment energizer is a heating energizer.

4. The system of claim 1, wherein said temperature-adjustment energizer is a cooling energizer.

5. The system of claim 1, wherein said control period alternates between activation periods and hold periods, said activation periods including transition between at least two different seating conditions and returning to a first seating condition.

6. The system of claim 1, wherein said control period includes at least two activation periods, each activation period including activation of one of said energizer members, wherein a first activation period includes activation of a first energizer member and a second activation period includes activation of a second energizer member.

7. The system of claim 1, wherein after a first hold period, said energizer members cycle through at least two different collective seating conditions including a first collective seating condition and a second collective seating condition, with a second hold period occurring when said controls return to said first collective seating condition.

8. The system of claim 7, wherein said seat further includes a lumbar actuator and wherein said electrical controller automatically activates, as a function of time, in response to said preprogrammed profile, said lumbar actuator to alter lumbar movement of said back portion of said seat by slow movement.

9. The system of claim 1, wherein said seat has a seat bottom, and comprising at least one actuator to tilt the seat bottom, wherein said electrical controller automatically activates, as a function of time, said seat bottom actuator to tilt the seat bottom in response to said preprogrammed profile.

10. The system of claim 9, wherein said electrical controller automatically activates simultaneously, as a function of time, said seat back actuator to incline the seat back and said seat bottom actuator to tilt the seat bottom in response to said preprogrammed profile.

11. The system of claim 9, said seat further includes a lumbar actuator and wherein said electrical controller automatically activates, as a function of time, in response to said preprogrammed profile, said lumbar actuator to alter lumbar movement of said back portion of said seat by slow movement.

12. The system of claim 9 wherein said position-adjustment seat back inclining actuator and said seat bottom tilting actuator each have alternating movement periods and stationary periods in which at least some of such stationary periods are of at least 5 minutes in duration.

13. The system of claim 9 wherein said position-adjustment seat back inclining actuator and said seat bottom tilting actuator and said lumbar actuator each have alternating movement periods and stationary periods in which at least some of such stationary periods are of at least 5 minutes in duration.

14. The system of claim 1, wherein said seat further includes a lumbar actuator and wherein said electrical controller automatically activates, as a function of time, in response to said preprogrammed profile, said lumbar actuator to alter lumbar movement of said back portion of said seat by slow movement.

15. The system of claim 1 wherein said position-adjustment seat back inclining actuator has alternating movement periods and stationary periods in which at least some of such stationary periods are of at least 5 minutes in duration.

* * * * *

UNITED STATES PATENT AND TRADEMARK OFFICE
CERTIFICATE OF CORRECTION

| | | |
|---|---|---|
| PATENT NO. | : 7,566,096 B2 | Page 1 of 1 |
| APPLICATION NO. | : 11/567423 | |
| DATED | : July 28, 2009 | |
| INVENTOR(S) | : Paul B. Phipps | |

It is certified that error appears in the above-identified patent and that said Letters Patent is hereby corrected as shown below:

Column 11, line 17, please change "The system of claim 9," to --The system of claim 1,--.

Column 12, line 12, please change "The system of claim 1" to --The system of claim 9--.

Signed and Sealed this

Thirtieth Day of March, 2010

David J. Kappos
*Director of the United States Patent and Trademark Office*